(12) United States Patent
Lane et al.

(10) Patent No.: US 11,297,773 B1
(45) Date of Patent: Apr. 12, 2022

(54) AERIAL SAW

(71) Applicant: Signature Utility Services, LLC, Mountain Brook, AL (US)

(72) Inventors: Robert Kenneth Lane, Manning, SC (US); Collin Daniel Lafayette Mitchell, Myrtle Beach, SC (US)

(73) Assignee: Signature Utility Services, LLC, Mountain Brook, AL (US)

( * ) Notice: Subject to any disclaimer, the term of this patent is extended or adjusted under 35 U.S.C. 154(b) by 288 days.

(21) Appl. No.: 16/513,146

(22) Filed: Jul. 16, 2019

(51) Int. Cl.
*A01G 23/08* (2006.01)
*A01G 3/08* (2006.01)
*B27B 5/10* (2006.01)
*B27B 5/02* (2006.01)

(52) U.S. Cl.
CPC .............. *A01G 3/088* (2013.01); *B27B 5/02* (2013.01); *B27B 5/10* (2013.01)

(58) Field of Classification Search
CPC .............. A01G 3/088; B27B 5/02; B27B 5/10
USPC ...................................................... 144/24.13
See application file for complete search history.

(56) References Cited

U.S. PATENT DOCUMENTS

| | | | |
|---|---|---|---|
| 4,554,781 A | 11/1985 | Rogers | |
| 4,815,263 A | 3/1989 | Hartung et al. | |
| 4,984,757 A * | 1/1991 | Hartung | B64D 1/22 144/24.13 |
| 5,961,070 A * | 10/1999 | Bradford | B64D 1/22 144/335 |
| 6,394,156 B1 | 5/2002 | Ahvenlampi et al. | |
| 8,534,608 B1 | 9/2013 | Cox, IV | |
| 9,192,947 B1 | 11/2015 | Haddock et al. | |
| 9,456,559 B2 | 10/2016 | Dunn | |
| 10,869,433 B1 | 12/2020 | Haddock et al. | |
| 2004/0000409 A1 | 1/2004 | Abbott | |
| 2009/0000698 A1 | 1/2009 | Beresford | |
| 2020/0367441 A1* | 11/2020 | Guzman | B64C 39/024 |

FOREIGN PATENT DOCUMENTS

RU          2067818 C1      10/1996

OTHER PUBLICATIONS

Rotor Blade, Photographs from http://www.rotor-blade.com/, 2016, 5 pages.

* cited by examiner

*Primary Examiner* — Omar Flores Sanchez
(74) *Attorney, Agent, or Firm* — Angela Holt; Bradley Arant Boult Cummings LLP

(57) ABSTRACT

An improved aerial saw is provided, including (a) an elongated arm having a proximal end and a distal end; (b) a saw blade rotatably connected to the elongated arm between its proximal and distal ends; (c) an engine enclosure having a distal end and a proximal end, wherein the distal end of the engine enclosure is coupled to the proximal end of the elongated arm; and (d) a saw attachment member connected to the saw assembly between saw blade and the proximal end of the engine enclosure; wherein the saw attachment member is connectable to a support structure at a first connection point.

17 Claims, 6 Drawing Sheets

AERIAL SAW

BACKGROUND

Aerial saws are commonly used for large-scale tree trimming. For example, they are used to maintain highline and pipeline rights-of-way. The saws hang below a helicopter, and are operated by skilled pilots. Two prior art saw assemblies include: (1) a vertically oriented saw for trimming the sides of trees, and (2) a generally more horizontally oriented topper saw for trimming the tops of trees. An example of a vertically oriented saw can be seen in FIG. 1, and an example of a generally horizontally oriented prior art topper saw can been in FIG. 2.

A first type of prior art saw assembly can be seen in FIG. 1. This type of saw assembly can include an engine located in an enclosure 12, or cage, above multiple saw blades 8 that are vertically orientated when lifted by a helicopter 32. The helicopter carries a metal stem 28 that supports the engine, engine enclosure, and the saw. The engine operates and drives the saw, which is used to trim trees to maintain horizontal distances or widths of rights-of-way, such as along power lines and other utilities.

A second type of prior art saw assembly can be seen in FIG. 2. This type of saw assembly can have a circular saw blade 8 in a generally more horizontal orientation when operated under a helicopter. This type of saw assembly can be referred to as a topper saw. The topper saw can hang from a helicopter in an angled, but generally horizontal position and can be used to cut treetops. For example, in colder climates, ice and snow may cling to treetops, making them a hazard due to the risk of bending and breaking from the added weight of the ice and snow. To prevent this from happening, a topper saw can be used to cut the treetops after trees reach a certain height.

There are drawbacks, however, to the prior art topper saw assembly. As can be seen in FIG. 2, saw blade 8 is positioned at an angle relative to stem 28 when suspended in the air, and the saw assembly is attached at its end to stem 28. The attachment position of the saw results in high torque loads at the point where the saw is attached to stem 28. The resulting high torque loads can prevent the helicopter from flying accurately, which is required to safely and precisely cut treetops, and can result in mechanical failure of the components of the saw or stem. Use of this prior art arrangement has resulted in bowing and bending of stem 28. Additionally, the stress on the stem requires that the stem be constructed of stiffer and heavier steel pipe, which in turn can create weight and maneuverability problems for the helicopter.

A conventional approach to attempt to mitigate this drawback is to use a cable 80 (see FIG. 2) attached between a central area of the saw and the stem. Cable 80 helps to support the saw at a point higher on the stem and lessens the torque loads at the point where the stem connects to the saw. Cable 80, however, has drawbacks of its own. For example, the attachment location of the cable creates a constricted opening that can result in the cable and/or stem being entangled with tree limbs or power lines. In addition, there continues to be a great deal of torque on the stem even with the added cable 80. Also, the prior art stem attachment for a topper saw is not compatible with the stem attachment for a vertical saw, complicating the process of switching between the saw types. Thus, there is a need for a system that addresses the drawbacks of the prior art systems that connect the stem to the end of the saw assembly.

SUMMARY

This invention provides an improved aerial saw that addresses the above deficiencies of prior art aerial saws by having a saw assembly connected to a supporting structure at a point between the ends, as opposed to at one end, of the saw assembly. This is an improvement over prior art systems, which exert a great deal of torque on the stem due to the stem attaching at the terminal end of the saw assembly.

This invention provides a saw attachment member which provides an enhanced structural connection point for the aerial saw assembly. In addition, the saw attachment member is attachable in the same manner as a vertical saw, allowing for efficient interchangeability between saws. The location of the connection point alleviates much of the torque on the stem, which was a problem in prior art systems.

The saw assembly can be stabilized at a desired angle by a brace attached at one end to the engine enclosure and at the other end to the saw support stem. An adjustable coupling to the saw support stem can allow for adjustment of the angle between the saw and the support stem.

DETAILED DESCRIPTION OF THE DISCLOSURE

Figure 1:
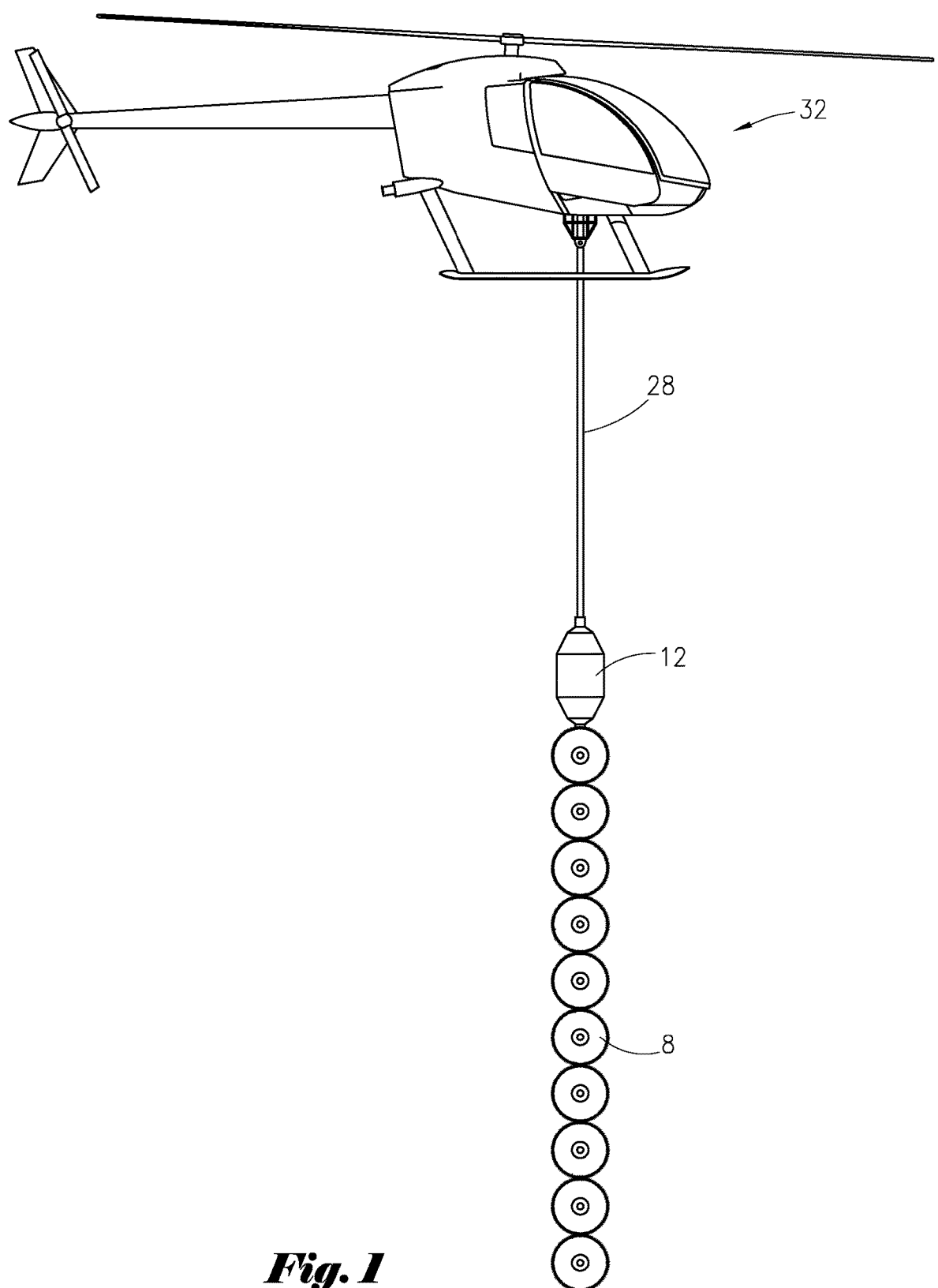
FIG. 1 is a view of a prior art vertical aerial saw assembly.
Figure 2:
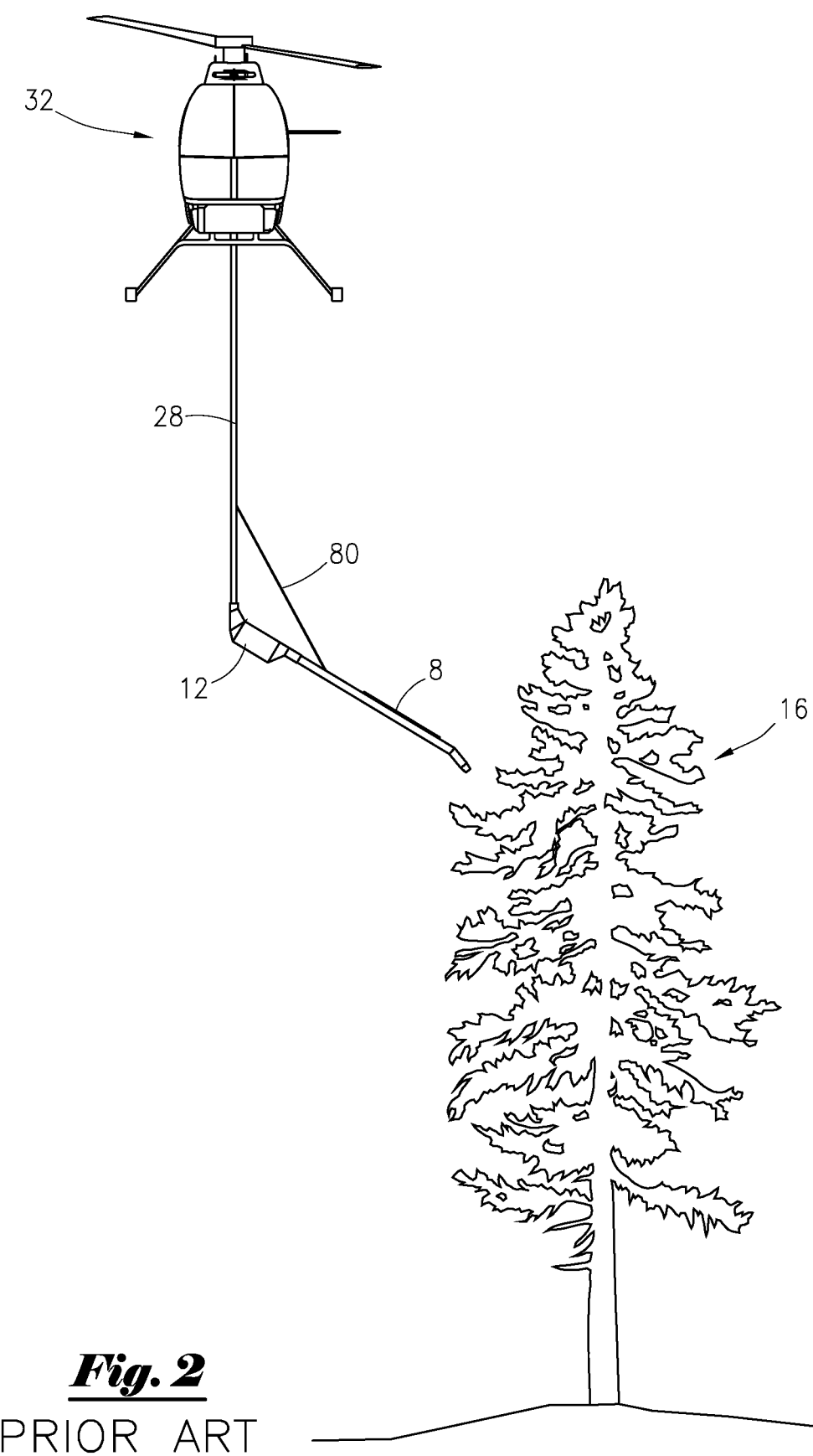
FIG. 2 is a view of a prior art aerial topper saw assembly.
Figure 3:
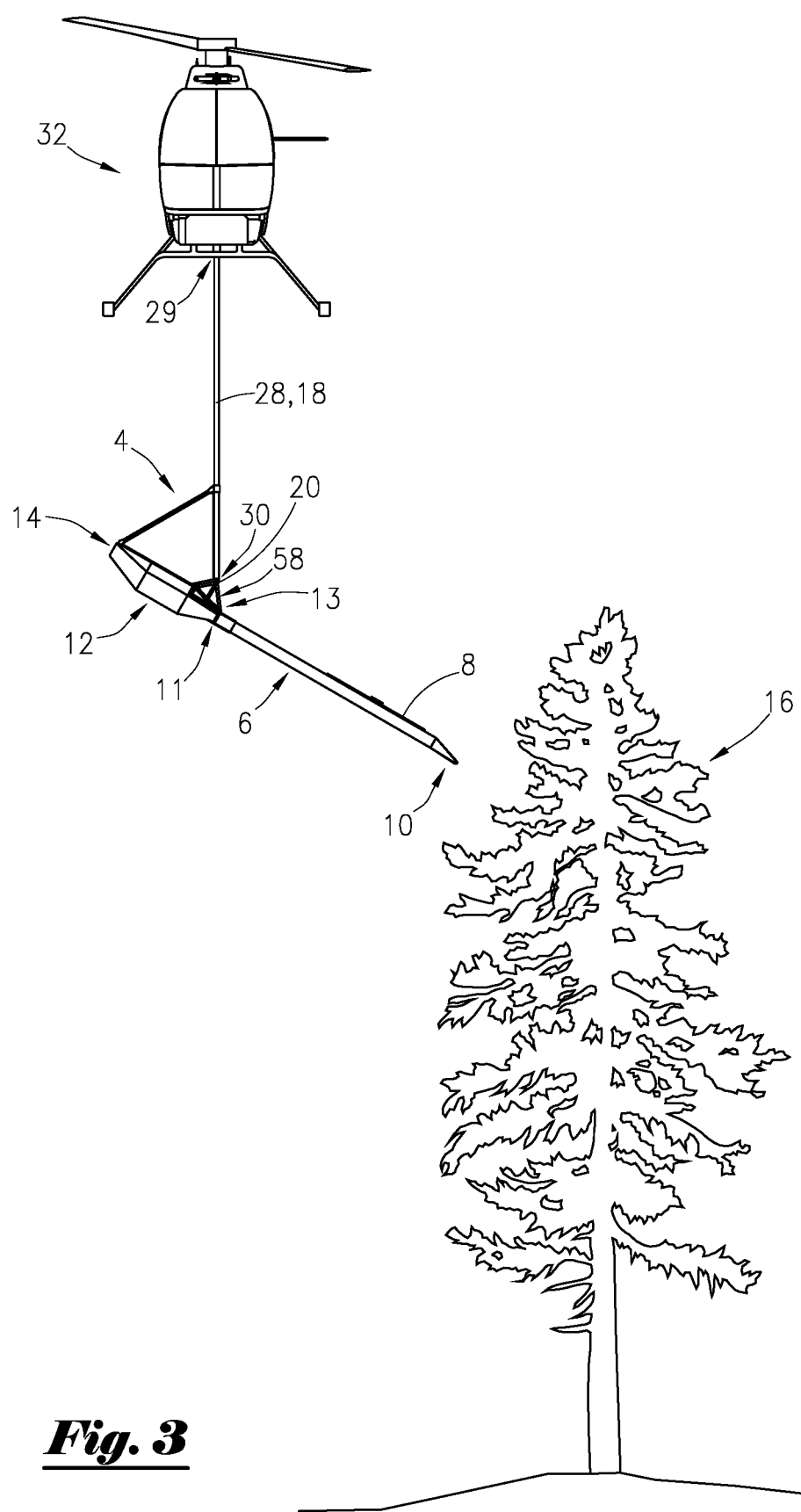
FIG. 3 is a side view of an embodiment of the improved aerial saw assembly.
Figure 4:
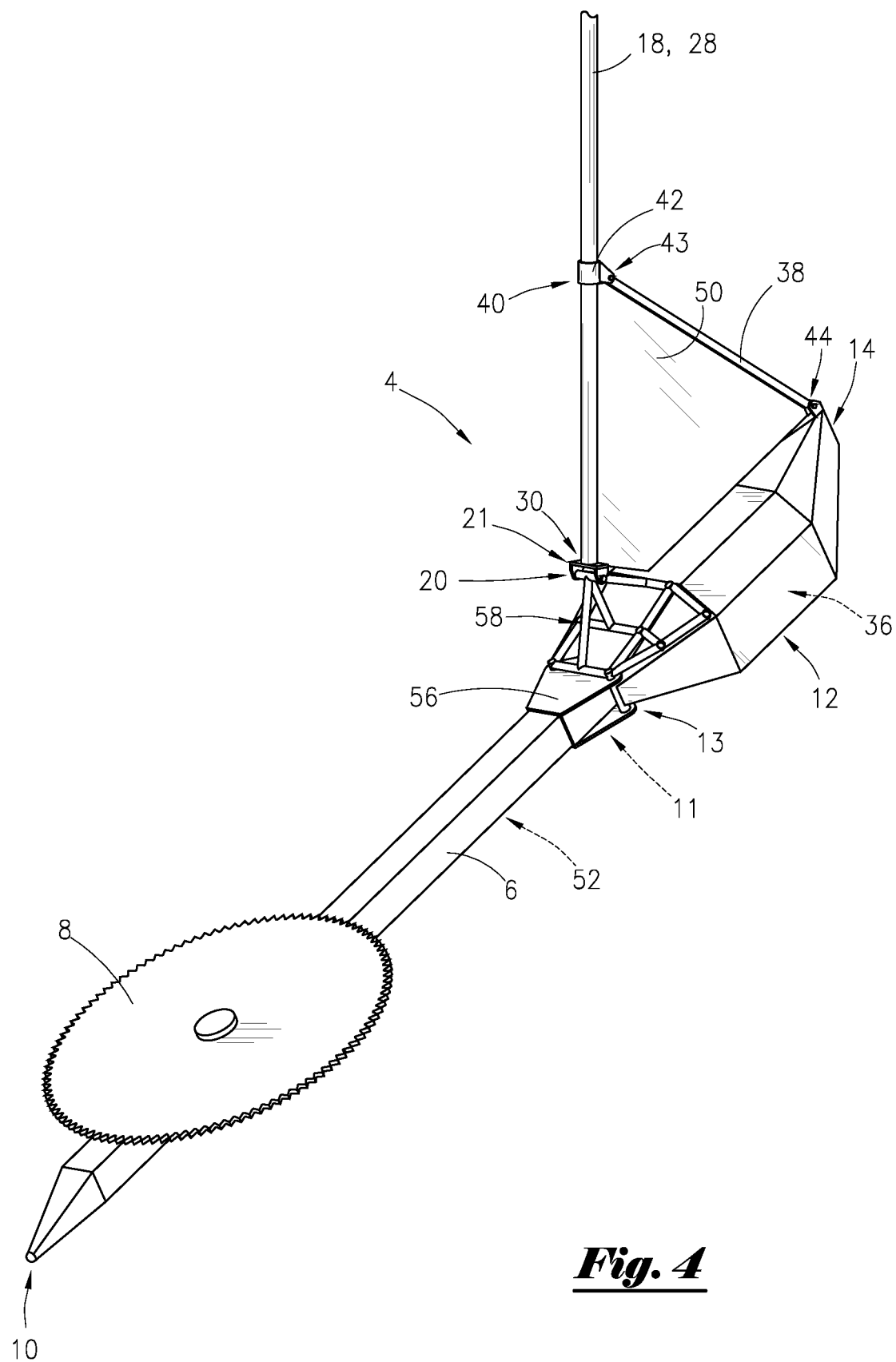
FIG. 4 is a perspective view of an embodiment of the improved aerial saw assembly.

With reference to the Figures, and particularly with reference to the embodiment of the improved saw assembly illustrated in FIGS. 3-6, the invention comprises an aerial saw assembly 4 that may be connected via a support structure 18 to an aerial vehicle 32, such as a helicopter. Support structure 18 may include an elongated stem 28, but includes any structure known in the art for suspending and operating an aerial saw. Stem 28 may be constructed of any material known in the art, such as steel, aluminum or composite materials. Saw assembly 4 includes an elongated arm 6 and a saw blade 8, which is rotatably connected to elongated arm 6 between its distal end 10 and proximal end 11.

Saw assembly 4 further includes an engine enclosure 12 having a distal end 13 and a proximal end 14. Distal end 13 of engine enclosure 12 is coupled to proximal end 11 of elongated arm 6. Saw blade 8 is operably connected to an engine 36 (mounted within engine enclosure 12) via a drive mechanism contained within elongated arm 6, all by means known in the art. In the embodiment shown, elongated arm 6 distally extends beyond the cutting edge of saw blade 8. Saw assembly 4 is used to trim or cut items, such as a tree 16.

Saw assembly 4 is connectable to support structure 18 (such as elongated stem 28) at a first connection point 20 between distal end 10 of elongated arm 6 and proximal end 14 of engine enclosure 12. Elongated stem 28 has a first end 29 and a second end 30. First end 29 of stem 28 is connectable to an aerial vehicle 32 (e.g., a helicopter, an unmanned aerial device [such as a drone], etc.), and second end 30 of the stem 28 is connectable to saw assembly 4 at first connection point 20. While the connection of stem 28 to saw assembly 4 at the center of gravity of saw assembly 4 would place minimum torque stress on stem 28, some downward bias of elongated arm 6 is preferred during operation. Thus, first connection point 20 is preferred to be located near distal end 13 of engine enclosure 12, with the center of gravity of the saw between distal end 13 and saw blade 8. In some cases, first connection point 20 may be located anywhere between saw blade 8 and proximal end 14 of engine enclosure 12. In some embodiments, first connection point 20 may be located between distal end 13 and proximal end 14 of engine enclosure 12. The desired location of first connection point 20 may vary according to the size and weight of elongated arm 6, saw blade 8, engine enclosure 12 and engine 36. For example, materials of construction (e.g. aluminum versus steel) may result in differing weight distributions, causing the desired location of first connection point 20 to be adjusted somewhat for optimum operational leverage.

Figure 6:
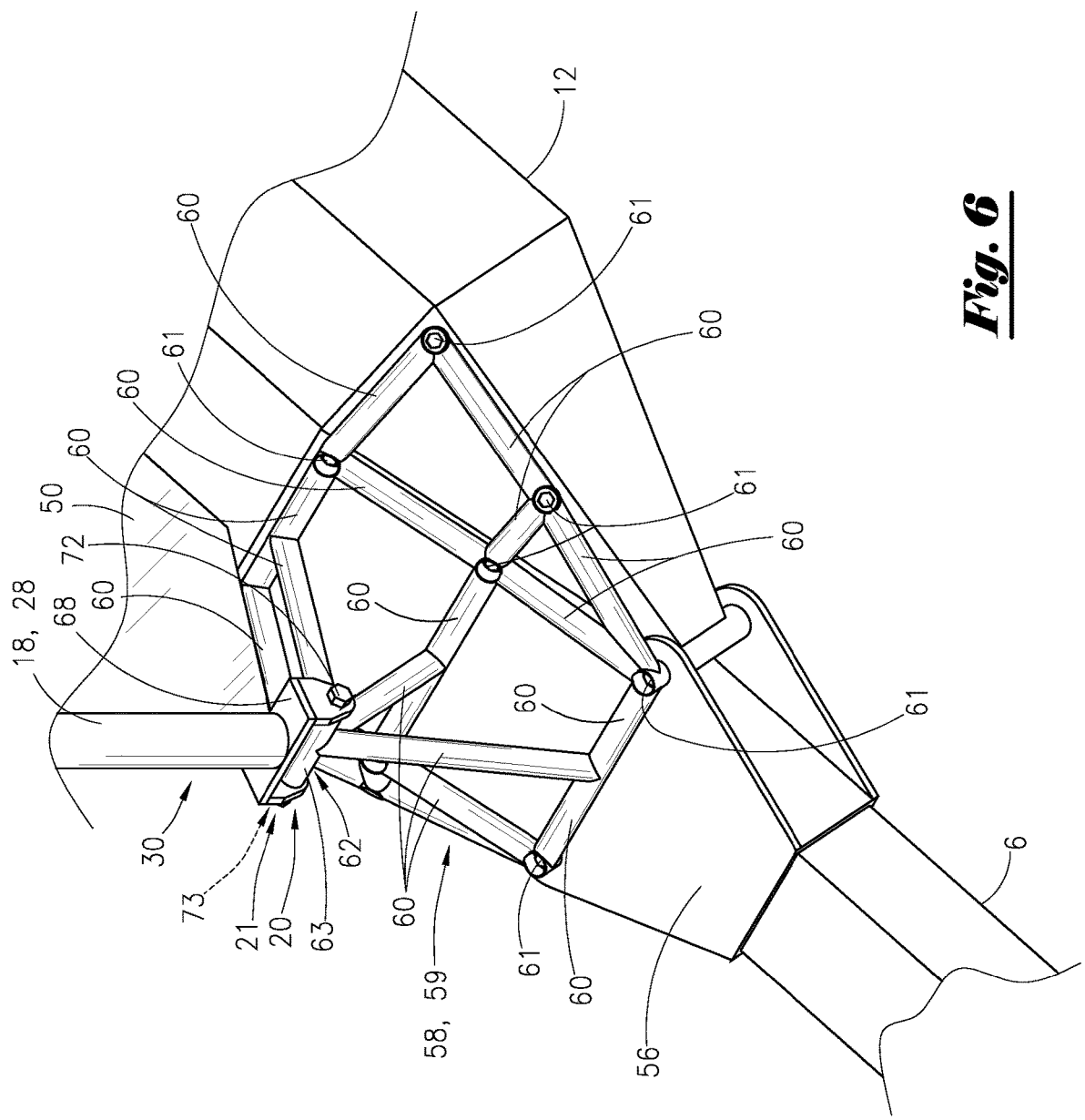
FIG. 6 is a perspective view of an exemplary saw attachment member and connection point for an embodiment of the improved aerial saw assembly.

Preferably, a saw attachment member 58 provides a secure connection between stem 28 and primary saw assembly 4. Saw attachment member 58 can take any convenient form known in the art, including a simple, direct bolted or pinned connection at a single point on saw assembly 4. However, it is preferred that saw attachment member 58 provides attachment to saw assembly 4 in a plurality of attachment points 61, so as to spread the load support over more than one point. To accomplish this goal, saw attachment member 58 may comprise a reinforced frame 59, as shown in FIG. 6. Frame 59 may include a plurality of frame members 60. Frame members 60 are rigidly interconnected (by welding or other known means) and preferably connect at multiple attachment points 61 to engine enclosure 12 and/or elongated arm 6. Secure attachment at attachment points 61 is accomplished by bolting, welding or other means known in the art. Frame members 60 preferably converge above engine enclosure 12, connecting to a single stem connection member 62 for connection at or about second end 30 of stem 28.

Figure 5:
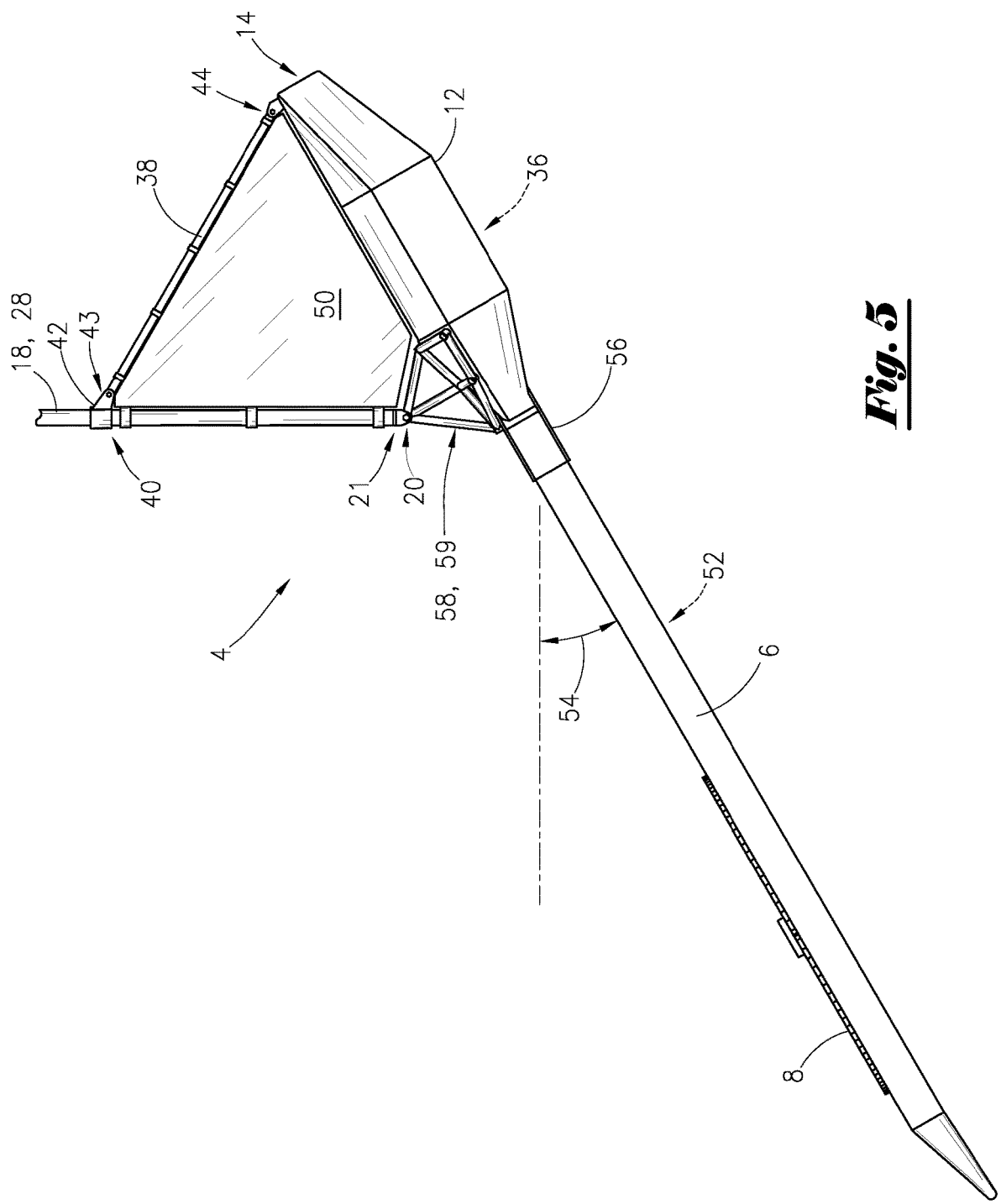
FIG. 5 is a side view of an embodiment of the improved aerial saw assembly.

Preferably, saw assembly 4 is connectable to stem 28 by a stem connection 21 at or about first connection point 20. As shown in FIG. 6, second end 30 of stem 28 preferably includes a yoke 68, connectable to stem connection member 62. Stem connection member 62 preferably includes a tubular receiver section 63, which fits inside of yoke 68 and is connectable to yoke 68 via a bolt 72 secured by a lock nut 73. Preferably, the angular position of saw assembly 4 is fixed via stem connection 21 and brace member 38 (discussed below). As shown in FIG. 5, during operation, saw assembly 4 is positioned such that elongated arm 6 is preferably positioned at an angle 54 between about 10 degrees and about 45 degrees downward relative to horizontal. In some cases, elongated arm 6 may be positioned at different angles, including substantially horizontal relative to ground level when operated.

Aerial saw assembly 4 preferably includes an elongated brace member 38 extending between a point at or about proximal end 14 of engine enclosure 12 and a second connection point 40 on stem 28. Second connection point 40 is located between first and second ends 29, 30 of stem 28. An adjustable coupling, such as a sleeve clamp 42, at first end 43 of brace member 38 attaches brace member 38 to stem 28. Second end 44 of brace member 38 is preferably attached at or about proximal end 14 of engine enclosure 12 by means of a bolt, pin or other means known in the art, allowing for angular adjustment of saw assembly 4. A deflector sheet 50 may be disposed within (and preferably substantially filling) the space defined by brace member 38, stem 28, and engine enclosure 12. Deflector sheet 50 may be constructed of any suitable material, but is preferably constructed of metal sheeting, and serves to deflect debris and to mitigate saw entanglement during operation.

During field assembly, yoke 68 is loosely attached to stem connection member 62 and adjustable clamp 42 is connected to stem 28, establishing angle 54. The connections at yoke 68 and both ends of brace member 38 are then tightened. Stem 28 is attached to aerial vehicle 32 and saw assembly 4 is positioned for operation.

A drive mechanism 52 is coupled to engine 36 disposed inside of, and supported by, engine enclosure 12. Drive mechanism 52 may be a belt-driven, chain-driven or any other drive mechanism known in the art. Drive mechanism 52 preferably extends from engine 36, along and preferably through elongated arm 6 to operate saw blade 8. Engine enclosure 12 may include an arm connection sleeve 56 disposed at distal end 13 of engine enclosure 12, providing a connection between engine enclosure 12 and elongated arm 6.

The term "about" as used herein typically means a numerical value which is approximate and whose small variation would not significantly affect the practice of the disclosed embodiments. Similarly, the term "substantially" as used herein typically means a majority (greater than 50%) of the characteristic modified by the term.

While preferred embodiments of the invention have been described, it is to be understood that the embodiments described are illustrative only and that the scope of the disclosure is to be defined solely by the appended claims when accorded a full range of equivalence, many variations and modifications naturally occurring to those skilled in the art from a perusal hereof.

What is claimed is:

1. An aerial saw assembly comprising:
   (a) an elongated arm having a proximal end and a distal end;
   (b) a saw blade rotatably connected to the elongated arm between its proximal and distal ends;
   (c) an engine enclosure having a distal end and a proximal end, wherein the distal end of the engine enclosure is coupled to the proximal end of the elongated arm; and
   (d) a saw attachment member connected to the saw assembly between the saw blade and the proximal end of the engine enclosure;
   wherein the saw attachment member is connected to a support structure at a first connection point.

2. The aerial saw assembly of claim 1, wherein the elongated arm distally extends beyond the saw blade.

3. The aerial saw assembly of claim 1, wherein the saw attachment member is connected to the engine enclosure between its proximal and distal ends.

4. The system of claim 1, wherein the saw attachment member is connected to the saw assembly at about a center of gravity of the saw assembly.

5. The aerial saw assembly of claim 1, further comprising an elongated stem having first and second ends, wherein the first end of the stem is connectable to an aerial vehicle, wherein the second end of the stem is connectable to the saw assembly at the first connection point.

6. The aerial saw assembly of claim 5, further comprising an elongated brace member having two ends and connected on one end to a point at or about the proximal end of the engine enclosure and on the other end to a second connection point on the stem, wherein the second connection point on the stem is located between the first end of the stem and the second end of the stem.

7. The aerial saw assembly of claim 6, further comprising an adjustable coupling connectable to the brace member and the stem at the engine enclosure.

8. The aerial saw assembly of claim 6, wherein a deflector sheet is disposed within the space defined by the brace member, the stem and the engine enclosure.

9. The aerial saw assembly of claim 8, wherein the deflector sheet substantially fills the space defined by the brace member, the stem and the engine enclosure.

10. The aerial saw assembly of claim 1, further comprising:
 (e) an engine enclosed inside of the engine enclosure; and
 (f) a drive mechanism coupled to the engine, wherein the drive mechanism extends from the engine along the elongated arm to the saw blade; and
 wherein the engine operates the saw blade via the drive mechanism.

11. The system of claim 10, wherein the saw blade is substantially circular and positioned in a plane substantially parallel to the elongated arm.

12. The aerial saw assembly of claim 6, wherein the elongated arm is positioned at an angle between about 10 degrees and about 45 degrees downward relative to a horizontal plane.

13. The aerial saw assembly of claim 1, wherein the saw attachment member comprises a frame having a plurality of frame members attached to the engine enclosure, the frame further including a saw attachment connector.

14. The aerial saw assembly of claim 5, wherein the saw attachment member comprises a frame having a plurality of frame members attached to the engine enclosure, the frame further including a stem connection member.

15. The aerial saw assembly of claim 14, further comprising a yoke connected at the second end of the stem, the yoke connectable to the saw attachment connector.

16. The system of claim 1, wherein the saw attachment member is connected to the saw assembly between the center of gravity of the saw assembly and the proximate end of the engine enclosure.

17. The aerial saw assembly of claim 5, wherein the elongated arm is positioned at an angle between about 10 degrees and about 45 degrees downward relative to horizontal.

* * * * *